Patented July 23, 1929.

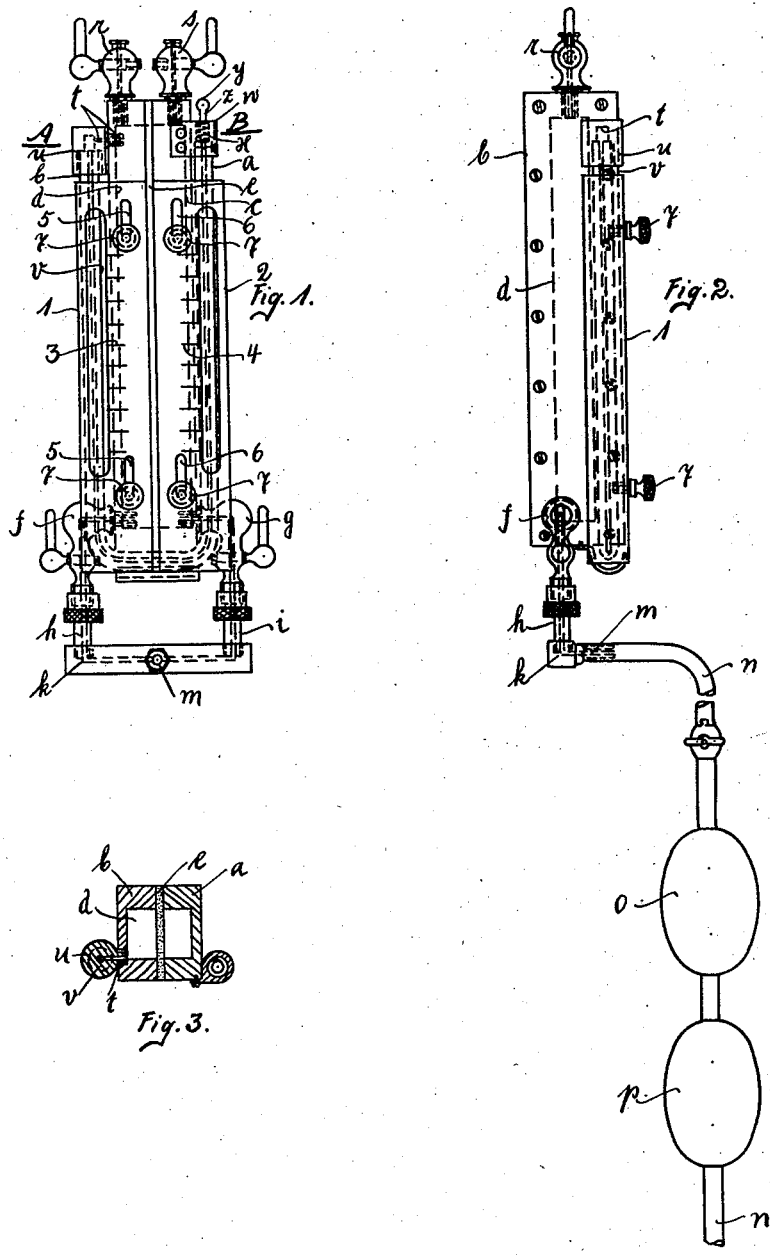

1,721,977

UNITED STATES PATENT OFFICE.

HERMANN SEWERIN, OF GUTERSLOH, GERMANY.

GAS INDICATOR.

Application filed March 19, 1927, Serial No. 176,759, and in Germany October 23, 1926.

Gas indicators of different kinds are known heretofore. All of them could not be used in mines, because the same could be attended to by skilled men only due to the indicator containing too complicated parts and being very sensitive, so that an ordinary miner, who knows to handle rough implements only, could not be entrusted with the use of such an apparatus. The object of the present invention is to overcome these drawbacks and to create an apparatus, which can be used without requiring a special skill by any miner, and its essence consists in that within a two-parted casing chambers are arranged directly beside one another and separated by means of a diffusion wall, which at the same time serves as a tightening washer between said two chambers, while the gas mixture can be taken off at any place by means of a double rubber ball and led from the latter to the indicator.

The accompanying drawing illustrates the invention by way of example in a suitable constructional form:

Fig. 1 is a front view,

Fig. 2 a side view, of the apparatus with the double ball belonging thereto,

Fig. 3 is a section on the line A—B of Fig. 1.

According to the invention, the gas indicator consists of two casing parts $a$ and $b$ containing the chambers $c$ and $d$. The latter are separated by the diffusion wall $e$ serving at the same time as a tightening washer between the casing parts $a$ and $b$ and consisting of bend-leather. To the casing parts $a$ and $b$ the shut-off cocks $f, g$ are attached so as to project into the chambers $c, d$. The shut-off cocks $f, g$ are connected by means of pipes $h, i$ with the intermediary member $k$ to which the inflow pipe $m$ is attached. The latter is connected with the rubber pipe $n$ of a double rubber ball $o, p$. Above the ball $o$ a shut-off cock $q$ is inserted in the rubber pipe $n$. The ball $p$ carries a rubber pipe $n^1$. On top of the casing parts $a$ and $b$ the ventilation cocks $r, s$ are mounted which lead into the chambers $c, d$. From the chamber $d$ leads a boring $t$ to the joining piece $u$, into which leads the glass tube $v$, that is partly filled with a suitably coloured liquid. The glass tube $v$ is U-shaped, lies around the casing parts $a, b$ and terminates in the holding member $w$. The latter has a pin $z$ (Fig. 1) influenced by a spring $x$ and fitted with a knob $y$, said pin when suitably adjusted bearing with a packing upon the boring of the glass tube $v$, and closing the same. To guard the glass tube $v$, envelopes 1 and 2 having scales 3 and 4 thereon are provided on the casing parts $a$ and $b$. Said envelopes have elongated slots therein arranged beside the scales 3, 4 for reading-off the pressure of the liquid. For the purpose of equalizing an unequal zero position of the indicating liquid, the envelopes are adjustable on the casing parts by having elongated slots 5 and 6 therein and by their being held on the casing by means of screws 7.

The manipulation of the gas indicator is very simple: The gas mixture taken from any place by means of the double ball $o, p$ is, after the cocks $f$ and $r$ on the gas indicator are closed and the packing of the pin $z$ is raised from the boring of the glass tube $v$, introduced into the chamber through the cock $q$, the rubber pipe $n$, the intermediary member $k$, and the shut-off cock $g$. The gas contained in the mixture passes, due to its low specific weight, quicker through the diffusion wall $e$ into the chamber $d$ and produces there an excess pressure, that acts through the boring $t$ and the joining piece $u$ upon the liquid contained in the glass tube $v$ and can be read off from the scales 3, 4. In order to keep the liquid in this position as well as in the zero position during an unlimited time, the pin $z$ in the holding member $w$ is by the knob $y$ brought in such a position that it bears by action of the spring $x$ with its packing upon the boring of the glass tube $v$ and completely shuts-off the same from the outer air. Upon the gas mixture being measured, the cocks $f$ and $r$, as well as the cocks $g$ and $s$, are opened and atmospheric air is taken by the double rubber ball $o, p$ from the air conduits existing in all mines, and the chambers $c, d$ communicating through the member $k$ are rinsed therewith, so that the indicator is ready for a fresh measurement. Besides, the chambers can be separately rinsed, for instance, by first opening the cock $f$, then shutting off the same, and finally opening the cock $g$. The indicator can be mounted in the mine at all air control places, so that the air controlling persons and miners need to carry with them the double ball with the rubber pipes $n, n^1$ only. It can also be carried along by each foreman miner as an accessory of his implements, so that he is capable of controlling the air several times during the work. By the rubber pipe $n^1$ of the double rubber ball $o, p$ the gases can be taken from any place at the top of the mine pits, and even there where the apparatus itself cannot be placed for lack of room, which gases can then be introduced with open cock $q$ by the ball $o$ into the indicator and their nature read off from the scale after the rubber pipe $n$ has been connected with the pipes $m$ and the indicator correspondingly adjusted.

By the present invention, it is reliably attained that the gases can be tested at any place, as the same can be taken by means of the rubber pipe and measured at the next indicator.

What I claim, is:

1. The combination, in a gas indicator, of a two-parted casing adapted in connection with a separating wall to form two chambers arranged directly beside one another, one chamber receiving the gas mixture and the other serving as a diffusion chamber, a diffusion wall separating said chambers and serving at the same time as a tightening washer between the same, and connections to the chambers having cut-off means and a common inlet serving for the introduction of the gas mixture and from which said chambers can be rinsed separately or commonly by atmospheric air.

2. A gas indicator as specified in claim 1, in which said diffusion wall consists of bend-leather.

3. In a gas indicator as specified in claim 1, envelopes with scales adjustably arranged around said chambers.

4. In a gas indicator as specified in claim 1, a U-shaped glass tube connected to said chambers, and a contrivance for shutting of the boring of the glass tube.

5. In a gas indicator as specified in claim 1, a double rubber ball having a rubber pipe at each end and adapted to take the gas by means of one rubber pipe end and to introduce it into the indicator by means of the other rubber pipe end, the latter having a shut-off cock therein, said double rubber ball serving at the same time for rinsing the chambers.

In testimony whereof I have hereunto set my hand.

HERMANN SEWERIN.